May 8, 1956   L. E. BAYNES   2,744,698
HIGH SPEED AIRCRAFT WING AND TAIL SURFACES
HAVING VARIABLE SWEEPBACK
Filed March 7, 1950   5 Sheets-Sheet 1
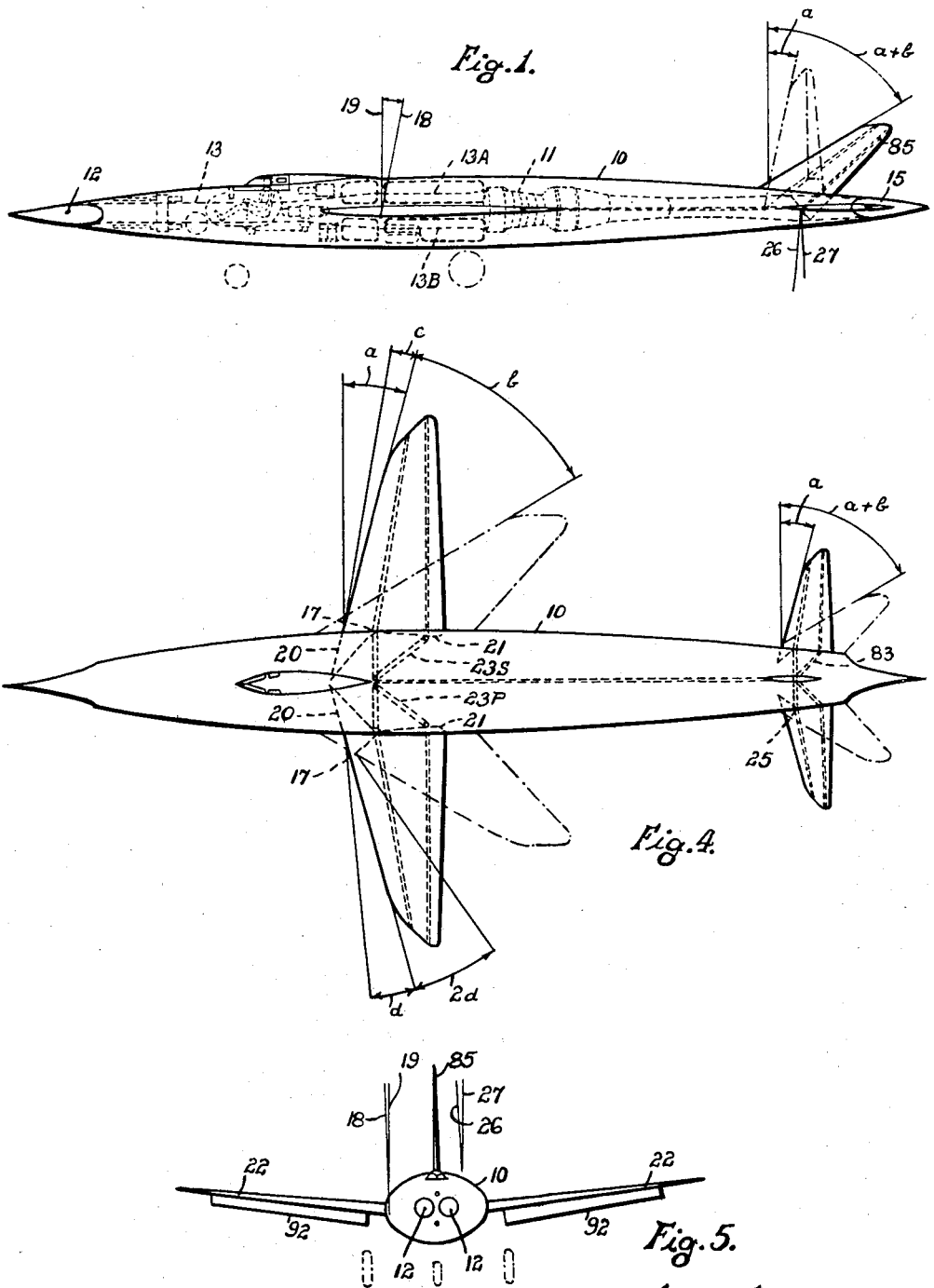

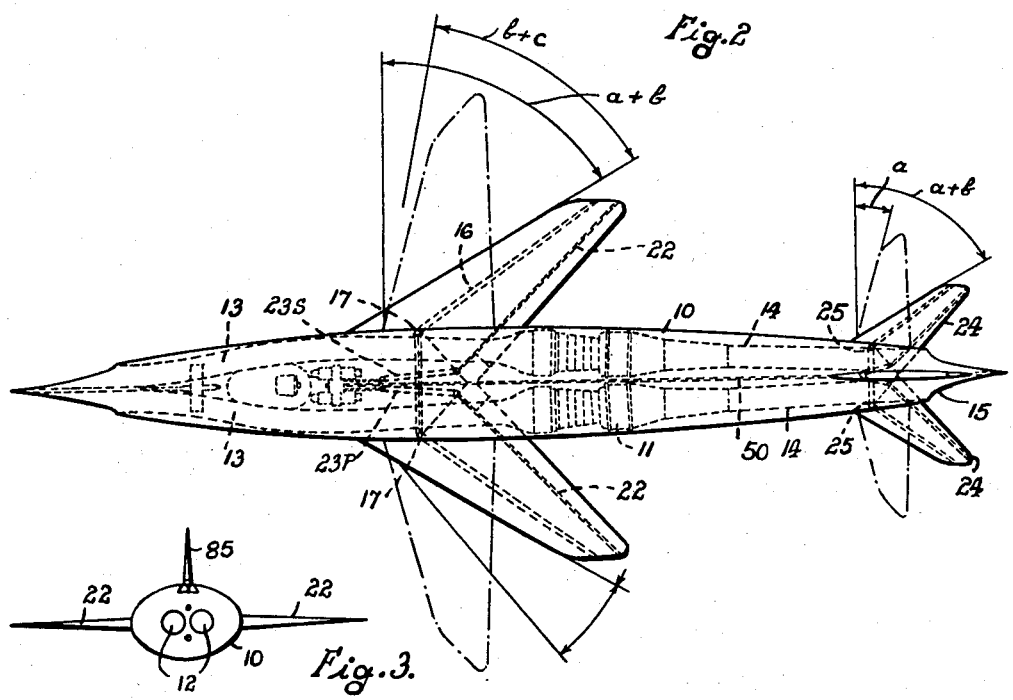

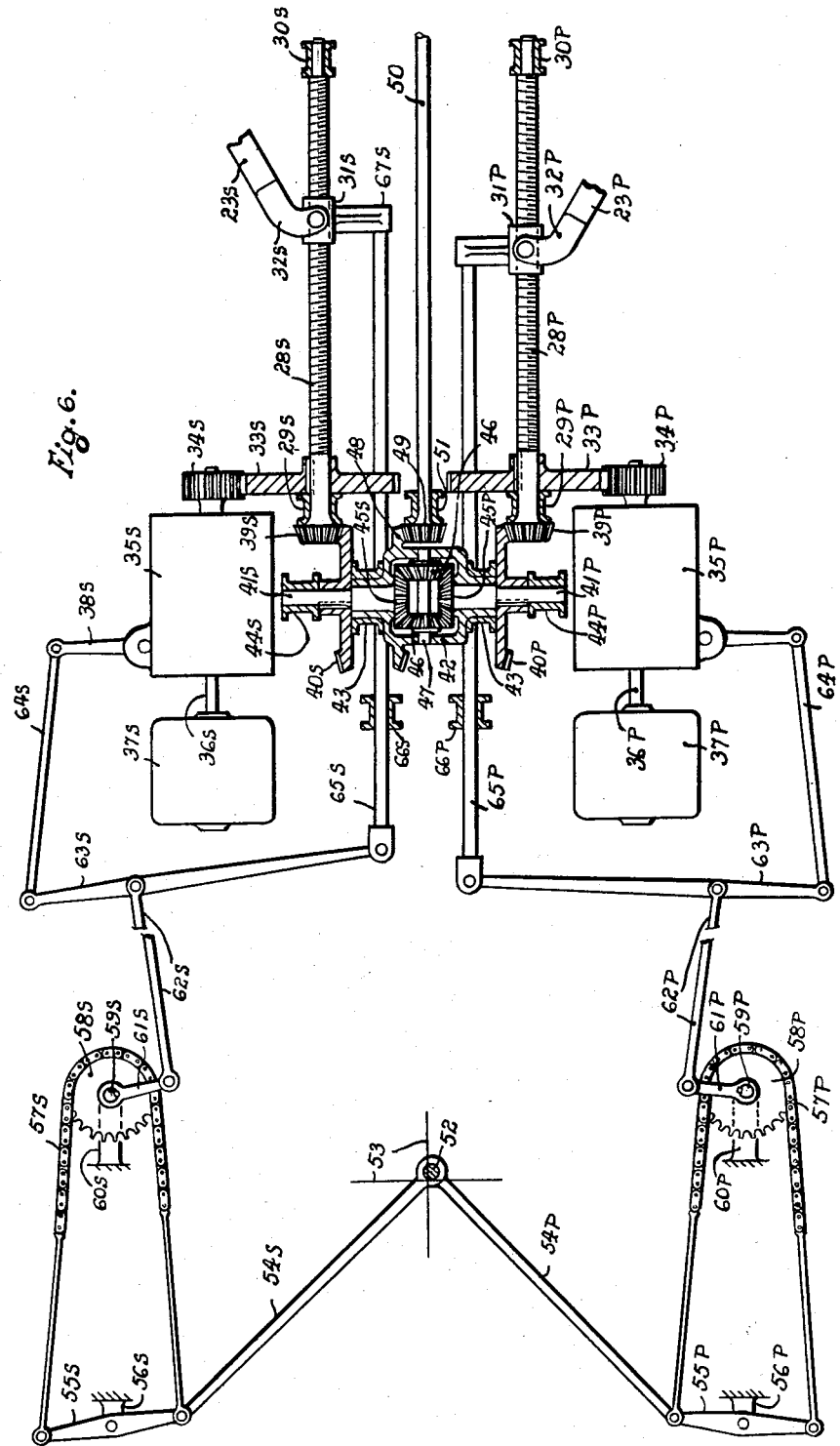

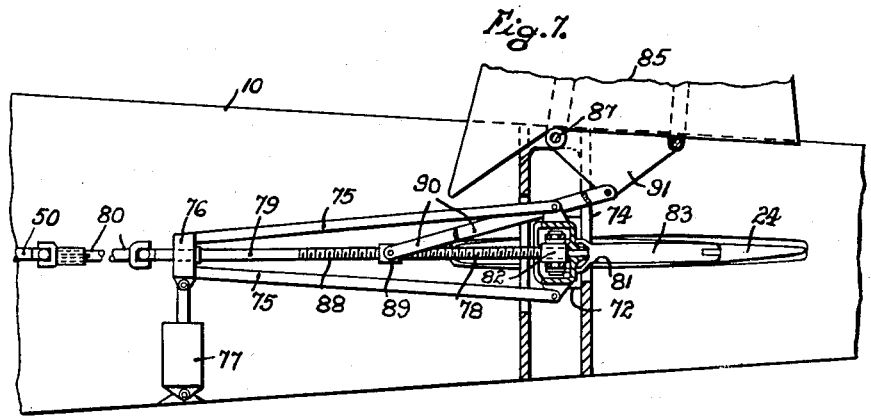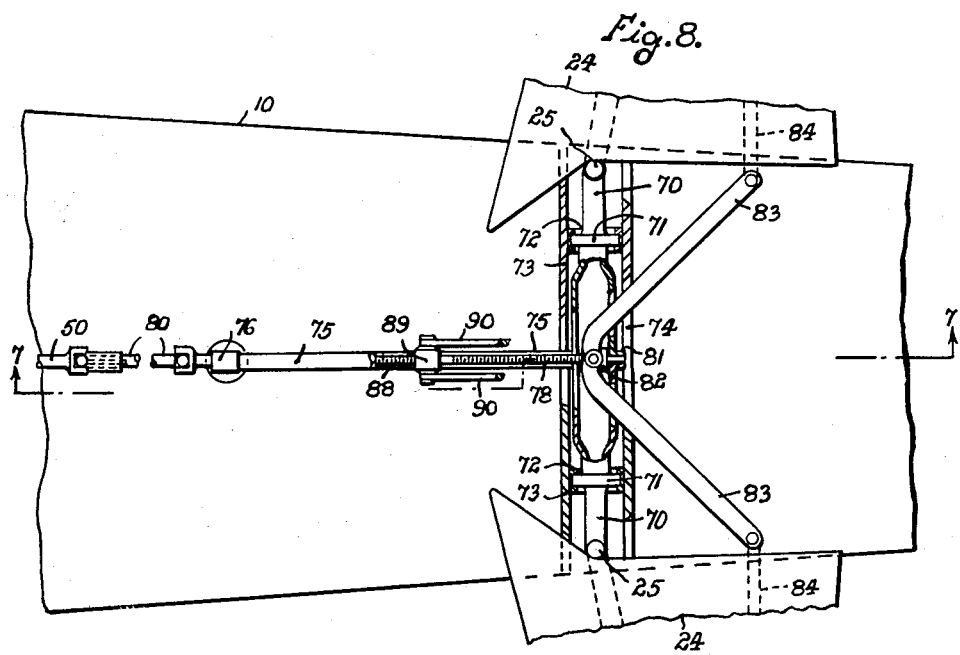

United States Patent Office 2,744,698
Patented May 8, 1956

2,744,698

HIGH SPEED AIRCRAFT WING AND TAIL SURFACES HAVING VARIABLE SWEEPBACK

Leslie Everett Baynes, Hounslow, England, assignor, by mesne assignments, to Baynes Aircraft Interiors Limited, Langley Aerodrome, Buckinghamshire, England Application March 7, 1950, Serial No. 148,179

Claims priority, application Great Britain March 11, 1949

6 Claims. (Cl. 244—42)

In the evolution of the modern aircraft the fixed wing with hinged control surfaces has survived, having proved efficient and satisfactory for speeds of flight up to that of sound, but with the advent of greatly improved propulsive systems providing sufficient power for flight beyond the speed of sound, an entirely new set of problems has arisen which requires radical departures in both the shape and the method of control of aircraft. It is an object of this invention to provide a solution to these new problems.

It is well known, for example, that as an aircraft approaches the speed of sound a rapid rise of drag, a loss of lift and a marked change in pitching moment occur owing to the effect of the compressibility of the air.

It has also been found that the critical speed at which these compressibility effects occur is increased and the adverse effects are minimised if the wings and tail surfaces have a pronounced sweepback, and if the aspect ratio and thickness/chord ratio are substantially reduced. Accordingly plan forms have been proposed with sweepback angles of at least 60°, or delta plan form shapes with the leading edge forming a sharp angle V and with the aspect ratio in some cases as low as unity. Wing sections with thickness/chord ratios of not more than 0.06/1 have also been proposed.

Whilst these plan forms and thin wing sections may be a near approach to the ideal for the achievement of transonic or supersonic flight, they are manifestly unsuitable for low-speed flight as required for take-off and landing, where the requirements are maximum lift coefficient and control. This is due to the fact that, firstly, the normal increment of lift obtainable by the use of flaps is substantially reduced or even eliminated when flaps are employed with swept-back wings, secondly, pronounced sweepback causes a spanwise outward movement of the flow over the wings such as to cause a premature stalling at the wing tips and, thirdly, with wings of small aspect ratio the induced incidence is of such a magnitude that the angle of incidence corresponding to maximum lift is too large for the maximum lift to be realised on landing without provision of excessively large under-carriages, and at these large angles of incidence pronounced sweepback also causes instability.

The net result of these combined effects is to reduce the maximum lift coefficient obtainable in practice to not more than about one-third of that which could be obtained with a conventional unswept wing fitted with flaps and of normal thickness and aspect ratio. This of course means that such an aircraft either will have to take off and land at a much higher speed than will an aircraft having conventional wings, or will have to have wings of about three times the area, with a consequent increase in structure weight and drag; both of these characteristics are obviously undesirable in an aircraft designed for very high speed.

Since the plan form and other characteristics required for supersonic flight are therefore in direct conflict with those required for low-speed flight, and since the ratio between maximum and minimum speed, or the speed range, may now be as wide as 10 to 1 or more, there is clearly a need for means to change the plan form to suit these extreme conditions of flight.

It is an important object of the invention to provide an aircraft in which the sweepback of the wings can be adapted while in flight for low and high speed flight.

It will be apparent that, if the wings alone were moved in such a manner as to change the sweepback, there would be a change in pitching moment and therefore a change in the attitude of the aircraft due both to change in the position of the aerodynamic centre of the wings and body relative to the centre of gravity of the aircraft and also to a change in the wing lift slope relative to the tail lift slope arising from the change in wing aspect ratio. Both effects would tend to give a nose-up moment as the sweepback was decreased. Whilst some of this change is admissible and desirable, in that a change in the incidence of the aircraft is required as between low-speed flight and high-speed flight and is in effect normally achieved by a movement of the elevator or by tail trim gear, there would have to be a change in tail moment in the opposite sense which would give a net change in pitching moment not exceeding that required to change the lift coefficient at which the aircraft trimmed to a value appropriate to the change in speed of flight as between high-speed trim and low-speed trim. In an aircraft according to the invention, and having its centre of gravity positioned to give positive tail loading to trim, the expedient of varying the tail sweepback in unison with the wing sweepback can maintain the change of trim within the desired limits, as a consequence not only of the change in the lift slope of the tail arising from the change in tail aspect ratio, but also of the further important compensating effects as the wings are swept forward, of the reduction in the wing downwash angle, which results from the increase in aspect ratio of the wings, and of the increased tail arm in terms of the wing chord. A secondary compensating factor is the fact that the movement of wings and tail causes a movement of the centre of gravity of the aircraft in the same direction as the movement of the aerodynamic centre of the wings.

The increase in aspect ratio and therefore span with reduction in speed has the additional advantage that the induced drag, which forms a comparatively large part of the total drag at take-off and climbing speeds, is greatly reduced with a consequent improvement in take-off and climb performance.

A single-seat aircraft representing a preferred form of the invention will be described by way of example and with reference to the accompanying drawings, in which:

Figures 1, 2 and 3 are respectively a side elevation, a plan and a front end elevation of the aircraft in condition for high-speed flight.

Figures 4 and 5 are respectively a plan and a front end elevation of the aircraft in condition for taking off and landing.

Figure 6 is a diagrammatic plan of part of the control mechanism for longitudinal and lateral control.

Figure 7 is a diagrammatic side elevation of tail incidence gear, sectioned on the line 7—7 in Figure 8.

Figure 8 is a plan of the same gear, shown partly in section.

Figure 9:
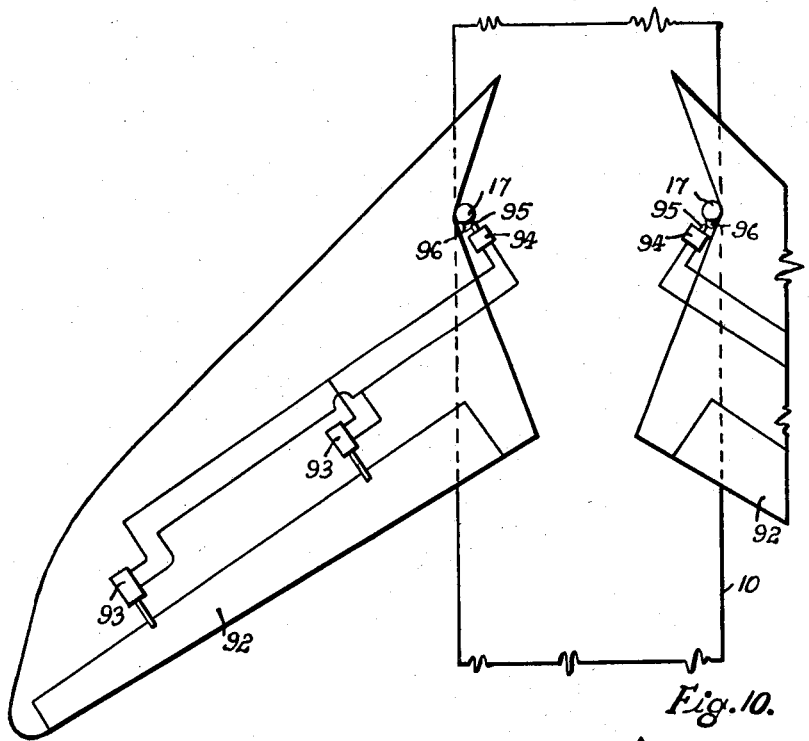
Figure 9 is a diagrammatic plan of operating mechanism for hinged flaps.

The fuselage 10 is of elliptical cross-section having its major axis horizontal, the fuselage accommodating two axial-flow turbo-jet motors 11 placed side by side behind the wing roots. Two air inlet ports 12 placed side by side at the nose of the fuselage open to two ducts 13 which diverge horizontally to clear the pilot's cockpit and control mechanism. Behind the cockpit each duct divides into two branches 13A and 13B which pass respectively above and below the level of the wing roots and lead to the compressor inlet. Two nozzle ducts 14 lead from the two turbines, converging slightly, to nozzles 15 in the tail of the fuselage, and each divides into two branches passing respectively above and below the centre section of the horizontal tail elements.

The main wing spar 16 is provided with two hinges 17 disposed adjacent to and inside the skin of the fuselage at its two sides respectively. The axes 18 (Figures 1 and 5) of these hinges are slightly inclined to perpendiculars 19 to the plane containing the longitudinal axis of the fuselage and the major axes of its elliptical sections, in such a manner that the hinge axes when extended upwards are inclined laterally and rearwardly with respect to the respective perpendiculars. The leading and trailing portions 20 and 21 (Figure 4) of the wing roots extend into the fuselage through longitudinal slots in the skin in order to prevent the occurrence of any gap between wing and fuselage when the wings are in either their spread or their sweptback position.

Each wing has an auxiliary spar 22 behind the main spar, and the auxiliary spar may be guided in the fuselage in such a way as to take vertical forces due to torsional loads on the wing. Alternatively these loads may be taken solely by the hinges 17 of the main spar. The inner ends of the auxiliary spars 22 of the two wings are pivotally connected to two operating struts 23P and 23S leading inwards and forwards to two irreversible screw-jack mechanisms disposed side by side longitudinally of the aircraft.

The horizontal tail elements 24 are mounted on hinges 25 and controlled by a single screw-jack mechanism. The axes 26 of the hinges 25 are slightly inclined to perpendiculars 27 in such a manner that the hinge axes when extended above the tail elements are inclined laterally and rearwardly with respect to the respective perpendiculars, as indicated in Figures 1 and 5.

The sense of the lateral inclinations of the wing and tail hinge axes relatively to the perpendicular and the magnitudes of these lateral inclinations and of the rearward inclinations of the axes are chosen according to the relative amounts of change in dihedral and incidence required with change in sweepback.

The port wing jack and the starboard wing jack are operated respectively by duplicated electric actuators deriving their power from generators driven by the aircraft power plant and controlled by repeater means generally similar to those employed in conventional power-operated controls. The control means, which are so arranged that the two pairs of actuators move differentially for lateral control and together for longitudinal control, are shown schematically in Figure 6. Corresponding parts on the port and starboard portions of the mechanism are denoted by the same reference numerals followed by the reference letters P and S respectively. Each wing jack consists of a screw 28 rotatable in fixed bearings 29 and 30, and a nut 31 engaged on the screw and pivotally connected to a yoke end 32 of the associated strut 23. A gear wheel 33 fast on the screw meshes with a pinion 34 forming the output member of a reversing and change-speed gear 35 providing a velocity ratio which is variable continuously from a maximum speed in one direction, through a neutral condition to a like maximum speed in the opposite direction. The gearing may be of the positive-displacement hydraulic type such as is commonly employed as a servo-mechanism in aircraft controls. An input shaft 36 of the gearing is driven continuously by an electric motor 37. The gearing 35 is controlled by a lever 38 shown in the neutral position. Movement of the lever 38 to the left of the neutral position (i. e. forwards with reference to the fuselage of the aircraft) causes the pinion 34 to be rotated in such a direction as to cause the nut 31 to be drawn forwards so as to increase the sweepback angle of the wing, the speed of operation of the jack being proportional to the angular displacement of thes lever 38. Similarly displacement of the lever 38 aft causes the sweepback angle of the wing to be reduced.

The jack screws 28 are rigid with bevel pinions 39 which mesh with bevel wheels 40 keyed to input shafts 41 of a differential gear having a cage member 42 carried in bearings 43. The outer ends of the shafts 41 are carried in bearings 44. Bevel pinions 45 on the shafts 41 mesh with planet bevel pinions 46 rotatable on a pin 47 fast in the cage 42. A bevel wheel 48 fixed on the cage 42 meshes with a bevel pinion 49 on a shaft 50 which is carried in bearings such as 51 and which leads aft to a tail jack. It will be evident from Figure 6 that the hands of the wing jack screws and the layout of the differential gearing are such that the mean position of the wing jack nuts 31 will determine the position of the tail jack without regard to any differential displacement of the wing jacks.

The common control member for longitudinal control and lateral control is a control column shown at 52 in Figure 6; the crossing point of the lines 53 indicates the mid position of the control column. Two links 54 diverging forwards and outwards are pivotally connected between the control column 52 (at a point thereon which moves in the same directions as the pilot's handle) and respectively two two-armed levers 55 pivoted at their mid points on fixed bearings 56. The relationship of the parts is such that, firstly, as the column is moved forwards, the ratio of increment of longitudinal movement of the column to increment of angular displacement of the lever 55 increases, and, secondly, as the column is moved transversely, say, from port to starboard, the ratio of increment of transverse movement of the column to increment of angular displacement of the starboard lever 55S also increases.

The ends of each lever 55 are linked to a roller chain 57 engaged with a sprocket 58 fast on a shaft 59 rotatable in a fixed bearing 60. A crank arm 61 keyed to the shaft 59 is connected by a link 62 to an intermediate point on a floating lever 63 one end of which is connected by a link 64 to the appropriate gear control lever 38. The floating lever 63 is supported at its other end by a pivotal connection with a rod 65 which slides in a fixed bearing 66. The rod 65 is fixed to a bracket 67 extending from the appropriate jack nut 31, so that the rod 65 imparts a return motion from the jack to the floating lever 63. The mechanism operates in known manner to cause the jack to occupy a position determined by the angular position of the crank arm 61. The layout is such that, when the crank arm 61 is displaced from its mid position towards either of its limit positions, the ratio of increment of angular displacement of the crank arm 61 to increment of motion of the jack increases. The effect is that, when the wings are in or near either limit of the range of variation of sweepback angle employed for longitudinal control, the result of moving the control column laterally is to cause one wing to move towards the middle of the range of sweepback angle through an increment which is larger than the increment of movement of the other wing away from the middle of the range.

It will thus be apparent that by suitable disposition of the operating struts between the jacks and the wings and by suitable selection of the control mechanism between the control column and the jack screws, it is possible to secure differential displacements of the wings such that the longitudinal trim is changed when lateral control is applied. In the present example application of lateral control produces a nose-down trim when the wings are spread at low speed and a nose-up trim when the wings are swept back in a high-speed position.

The differential gearing shown in Figure 6 is connected to the tail elements by the mechanism shown in Figures 7 and 8. A main spar 70 of the horizontal tail elements 24, which is provided with the hinges 25, has on its centre section two journals 71 mounted for angular displacement about a transverse axis in bearings 72 carried by two transverse frames 73 and 74 of the fuselage 10. The mid portion of the spar 70 is of enlarged box section and is connected to two rods 75 which converge forwards and are rigidly fixed to a block 76. A tail incidence control jack 77 is connected as a vertical link between the block 76 and the fuselage 10 and operated by a conventional tail trim control gear (not shown).

The sweepback angle of the tail is adjusted by a jack having a screw 78 on a shaft 79 rotatable in a bearing in the block 76 and coupled by a Cardan shaft 80 to the shaft 50 that leads from the differential gear (Figure 6). The aft end of the jack shaft 79 is supported in a spigot bearing 81 in the spar 70. A nut 82 on the screw 78 is pivotally connected to two struts 83 which in turn are pivotally connected to auxiliary spars 84 of the tail surfaces 24.

A tail fin 85 is mounted on a transverse hinge 87 so that its sweepback angle can be varied. Such variation is effected by a jack screw 88 on the shaft 79 co-operating with a nut 89. A pair of struts 90 are pivoted to the nut 89 and to a lever 91 rigid with the fin 85, the arrangement being such that the two jacks operate in like directions to cause the fin sweep to be varied in unison with the sweep of the horizontal tail surfaces.

The wing flaps may be of any known type and may be operated either independently of or in dependence upon the operation of the wing sweepback mechanism. In the arrangement shown in Figures 4, 5 and 9, the flaps 92 are operated by hydraulic jacks 93 mounted in the wings in known manner. These jacks are controlled by hydraulic valves 94 fixed to the wings and having actuating tappets 95 co-operating with cams 96 on the fixed parts of the hinges 17 and so arranged as to cause the flaps to be lowered as the spread of the wings is increased.

Figure 10:
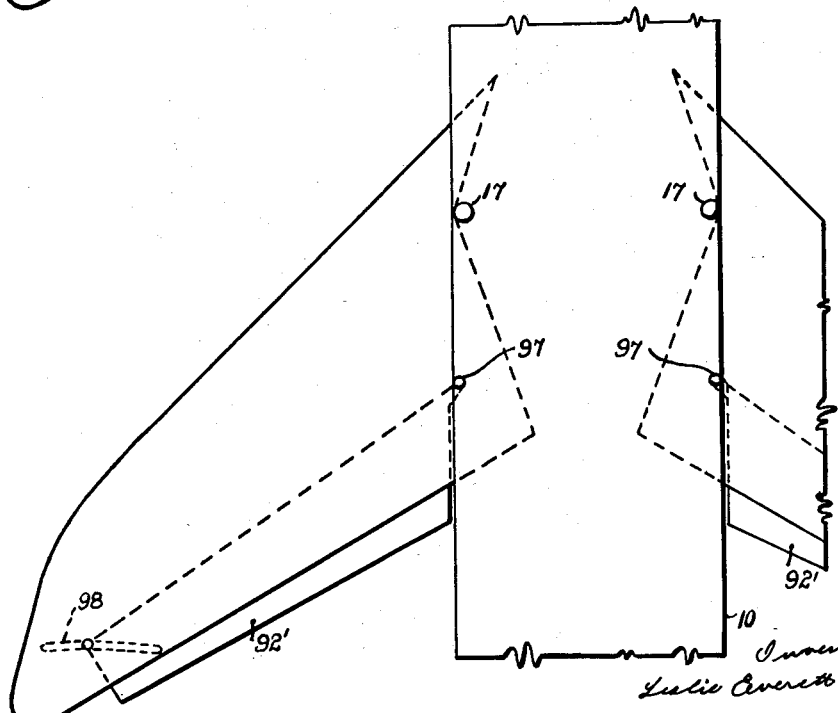
Figure 10 is a diagrammatic plan of a modified flap-operating mechanism for use with sliding flaps.

Alternatively the flaps may be operatively connected to the wings and the fuselage in such a manner that movement of the wings relative to the fuselage causes a chordwise movement of the flaps such as to increase the chord as the wings are spread and retract the flaps as the wings are swept back, thus reducing the compensation for wing movement required by the tail. Figure 10 shows one such arrangement. The flaps 92' are pivotally connected to the fuselage at 97 and slidably engaged with guide rails 98 fixed obliquely to the wings near their tips.

The improved method of lateral control enables the flaps to be made of full wing span instead of approximately half span as is normally the case, which will, of course, yield a much larger lift increment.

The differential and uniform variations in sweepback angle of the wings for lateral and longitudinal control, although operated by the power system described, are controlled by the pilot by the movement of the control column in the usual manner and, as in a conventional aircraft, there is a different control column position and appropriate wing incidence for each speed of flight, so in an aircraft controlled by the method described there is a different control column position and appropriate sweepback angle for each speed of flight, since the wing incidence at which the aircraft flies and therefore the speed is determined by the sweepback angle, in the same way that the wing incidence at which a conventional aircraft flies and therefore the speed is determined by the elevator angle.

Leading particulars of the example shown in Figures 1 to 5 are as follows:

| | Spread | Swept back |
|---|---|---|
| Span | 38 ft. 9 in. | 24 ft. 2 in. |
| Net wing area | 165 sq. ft. | 132 sq. ft. |
| Gross wing area | 220 sq. ft. | 220 sq. ft. |
| Mean chord | 5.68 ft. | 9.13 ft. |
| Thickness/chord ratio of wing section | 9.6% | 6% |
| Aspect ratio | 6.85/1 | 2.65/1 |
| Dihedral | 6° | 0° |
| Net tail area | 37.5 sq. ft. | 32 sq. ft. |
| Gross tail area | 52 sq. ft. | 52 sq. ft. |
| Tail volume ratio | 1.26/1 | 0.7/1 |
| Net fin and rudder area | 24 sq. ft. | 20 sq. ft. |
| Gross fin and rudder area | 34 sq. ft. | 34 sq. ft. |
| Fin and rudder volume ratio | 0.115/1 | 0.18/1 |
| Length of fuselage | 67 ft. 6 in. | |
| Weight, empty | 12,300 lb. | |
| Weight, gross | 20,000 lb. | |
| Stalling speed (15,000 lb. weight) | 115 M. P. H. | |

The tail volume ratio of 0.7/1 in the swept-back condition gives a total area of wings plus tail no greater than for a conventional aircraft with a tail volume ratio of 0.35/1, because the considerable positive loading of the tail to trim with the wings and tail spread results in a reduction of the wing area for a given stalling speed.

The leading and trailing edges of each wing converge at an angle of 17° towards the tips, the tail elements being geometrically similar to the wings. The sweepback angles marked in the upper parts of Figures 2 and 4 relate to longitudinal control range, and those marked in the lower parts of these figures relate to lateral control range. In the normal fully spread position of the wings and tail the leading edges are swept back at an angle $a$ (Figure 4) of 15° (to a perpendicular to the plane of symmetry of the aircraft) and in the normal fully swept-back position of the wings and tail the leading edges are swept back at an angle of $a+b=60°$; the range of longitudinal control movement may be from $c=5°$ forward to $b=45°$ backward from the normal fully spread position.

For lateral control, the differential operation of the wings may be such as to permit either wing to be displaced forwards through an angle $d=10°$ (Figure 4) to a limiting position such that its leading edge is swept back at 5° when the longitudinal control is set for the normal fully spread position of the wings and through an angle $e=20°$ (Figure 2) to a limiting position such that its leading edge is swept back at 40° when the longitudinal control is set for maximum mean sweepback. Such forward displacements of either wing are accompanied by rearward displacement of the other wing which may range from twice the angular displacement of the forwardly displaced wing when the longitudinal control is set for maximum spread to zero when the longitudinal control is set for maximum sweepback.

A disadvantage of excessive sweepback for flight at low speeds is that the sweepback tends to have the same effect on lateral stability as dihedral and this effect becomes more pronounced and excessive at large angles of incidence, coupled with an excessive degree of longitudinal stability due to the sweepback's causing a spanwise outward flow over the wings. This disadvantage is not present in the design according to the invention as there is no sweepback when the aircraft is flying at large angles of incidence; hence it is possible with the arrangements described to combine a variable dihedral with sweepback to give normal dihedral with no sweepback and no dihedral with sweepback by the expedient of inclining the wing hinge axes at slight angles to a perpendicular to the chord plane of the wing. A change in incidence of the wing relative to the fuselage with variations in sweepback may also, as described, be achieved by the same means, and the tail hinge axes may also be inclined in a similar manner to effect the same purpose.

The change in relative incidence of wing to tail, with change in wing sweep, resulting from the inclination of the hinge axes, may be employed either to vary the compensating moment of the tail according to whether no change in trim for a given lift coefficient is required, or to produce a change in trim appropriate to the change from high speed with the wings swept to low speed with the wings spread.

A further variable arising from variable sweepback which has a beneficial effect on the ratio of maximum lift to minimum drag is the fact that, whereas it has been found desirable to employ wing sections of about half the normal thickness/chord ratio if the high drag associated with supersonic flight is to be minimized, such very thin sections are not conducive to the attainment of high maximum lift coefficients, but with variable sweepback the thickness/chord ratio is varied at the same time because the effective chord becomes shorter as the sweepback is reduced, whilst the thickness of course remains constant. The chordwise position of the maximum thickness ordinate also moves fore and aft with these changes. The wing section therefore changes from a thick section and profile suitable for high lift at low speeds to a thin section and profile suitable for low drag at high speeds.

An aircraft according to the invention will therefore have at least some of the following characteristics made variable by the movement of the wings and in some cases the tail to give maximum efficiency at all speeds of flight:

(1) Variable sweepback.
(2) Variable aspect ratio.
(3) Variable thickness/chord ratio and profile.
(4) Variable incidence.
(5) Variable dihedral.
(6) Variable tail volume.

I claim:

1. An aircraft having a fuselage, two wings including flaps controllable to give increased lift, two tail members, hinging means the axes of which are approximately vertical when the aircraft is in level flight and which connect the wings and tail members to the fuselage, a tail fin, a hinge having a transverse horizontal axis and connecting the fin to the fuselage, and control means connected to the wings, the tail members and the fin and operable while the aircraft is in flight for varying the sweepback of the wings between an extended position for low-speed flight and a sweptback position for high-speed flight and simultaneously varying both the tail sweepback in such a manner that longitudinal trim of the aircraft is maintained within safe limits, and also the sweepback of the fin in such a manner that when the wings are folded back the aspect ratio of the fin is reduced below that necessary for low-speed flight, the control means being connected to vary the sweepback of the wings and tail members through approximately equal angles.

2. An aircraft having a fuselage, two wings including flaps controllable to give increased lift, hinging means connecting the wings to the fuselage, the axes of said hinging means being approximately vertical when the aircraft is in level flight but are inclined slightly rearward and laterally in the upward direction, a tail member controllable for varying the tail lift, and control means connected with the wings and tail member and operable while the aircraft is in flight firstly for varying the sweep-back of the wings between an extended position for low-speed flight and a swept-back position for high-speed flight and simultaneously varying the tail lift in such a manner that longitudinal trim of the aircraft is maintained within safe limits and secondly for providing differential variation of the angles of sweep-back of the two wings for the purpose of effecting lateral control of the aircraft.

3. An aircraft having a fuselage, two wings including flaps controllable to give increased lift, hinging means the axes of which are approximately vertical when the aircraft is in level flight and which connect the wings to the fuselage, said hinging means being inclined slightly rearward and laterally in the upward direction, a tail member controllable for varying the tail lift and control means connected with the wings and tail member and including a common control member operable while the aircraft is in flight firstly for varying the sweep-back of the wings between an extended position for low-speed flight and a swept-back position for high-speed flight and simultaneously varying the tail lift in such a manner that longitudinal trim of the aircraft is maintained within safe limits and secondly for providing differential variation of the angles of sweep-back of the two wings for the purpose of effecting lateral control of the aircraft.

4. An aircraft having a fuselage, two wings hinged to the fuselage about axes which are approximately vertical when the aircraft is in level flight, but are inclined rearward with respect to the upward vertical direction, a tail on said fuselage and having means controllable for varying the tail lift, and control means including two actuators operatively connected respectively with the two wings, a differential gear having two input members operatively connected with said actuators respectively and an output member operatively connected with said means for varying the tail lift.

5. An aircraft having a fuselage, two wings including flaps controllable to give increased lift, wing-hinging means the axes of which are approximately vertical when the aircraft is in level flight but slightly inclined laterally in an upward direction, and which connect the wings to the fuselage, a tail including two laterally extending tail members, tail hinging means the axes of which are approximately vertical when the aircraft is in level flight but slightly inclined laterally in an upward direction, and which connect the said tail members to the fuselage, all of said axes being inclined rearward with respect to the upward perpendiculars to the plane of symmetry, relatively to the wings, containing the longitudinal axis of said fuselage, and control means connected with the wings and the tail members and operable while the aircraft is in flight for moving the wings about the said hinge axes to vary the sweep-back wings between an extended position for low-speed flight and a swept-back position for high-speed flight, and for simultaneously moving the tail members about their said hinge axes to vary the sweep-back of the tail members, the directions of the tail hinge axes relative to the wing hinge axes being such that the desired amount of incidence change is effected between tail and wing as they are folded back to maintain the required longitudinal trim of the aircraft.

6. An aircraft having a fuselage, two wings constituting the major lifting surfaces in low and high-speed flight, including flaps movable at least in part chordwise of the wings to give increased lift, two tail surfaces, said wings and tail surfaces being hinged to the fuselage about axes which are approximately vertical when the aircraft is in flight, control means operable while the aircraft is in flight for varying simultaneously the sweep-back of the wings and tail surfaces between an extended position for said low-speed flight and a swept-back position for said high-speed flight, and means actuating the flaps in response to variation of sweepback of the wings to increase the effective wing chord as the sweep-back angle is reduced.

References Cited in the file of this patent

UNITED STATES PATENTS

| | | |
|---|---|---|
| 1,018,413 | Dunton | Feb. 27, 1912 |
| 1,506,867 | Schneider | Sept. 2, 1924 |
| 2,316,885 | Ortega | Apr. 20, 1943 |
| 2,580,176 | Johnson | Dec. 25, 1951 |
| 2,596,436 | Robert | May 13, 1952 |

FOREIGN PATENTS

| | | |
|---|---|---|
| 210,181 | Great Britain | Jan. 31, 1924 |
| 249,675 | Great Britain | Apr. 1, 1926 |
| 526,162 | Great Britain | Sept. 12, 1940 |